United States Patent [19]
Song et al.

[11] Patent Number: 5,321,267
[45] Date of Patent: Jun. 14, 1994

[54] BENCH FLOTATION SENSOR

[75] Inventors: Lynden A. Song, Hawthorne; Karl B. Conroy, Long Beach; Robert A. Reed, Redondo Beach, all of Calif.

[73] Assignee: Hughes Aircraft Company, Los Angeles, Calif.

[21] Appl. No.: 951,510

[22] Filed: Sep. 25, 1992

[51] Int. Cl.⁵ .......................... G01J 5/10; G01B 11/16
[52] U.S. Cl. .................... 250/349; 250/347; 356/373
[58] Field of Search ............... 356/373; 250/561, 349, 250/347

[56] References Cited

U.S. PATENT DOCUMENTS

| | | | |
|---|---|---|---|
| 3,495,089 | 2/1970 | Brown | 250/561 |
| 4,564,756 | 1/1986 | Johnson | 250/561 |
| 4,806,016 | 2/1989 | Corpron et al. | 356/373 |

OTHER PUBLICATIONS

Weissman et al., "Optical Displacement Measuring Device", ISA Trans., 19(4), 1980, pp. 73–77.

*Primary Examiner*—Carolyn E. Fields
*Attorney, Agent, or Firm*—M. W. Sales; W. K. Denson-Low

[57] ABSTRACT

A noncontact bench flotation sensor system for use with a flotation bench. The system comprises a plurality of reflectors that are disposed on the body of the bench, typically on the inside of the skirt or overhanging portion of the table surface of the bench. Each reflector is such that it reflects over a narrow region, or angle. Two sensor assemblies, preferably infrared, are disposed adjacent each reflector and are located on each leg of the bench. Each of the sensor assemblies is comprised of an transmitter and an detector. The two sensor assemblies are separated by a distance that corresponds to upper and lower limits of bench flotation. The sensor assemblies transmit infrared energy, for example, at the reflector. In the event that the isolator moves to a point where one of the transmitters is aligned with the reflector, energy is reflected back to the associated detector, and the reflected energy is detected. Output signals are generated by the sensor assemblies that are indicative of in flotation and out-of-flotation conditions of the bench. These signals are coupled to a display unit. The display unit incorporates a plurality of light emitting diodes (LEDs) that correspond to each of the possible flotation conditions, and an annunciator. In-flotation signals from the sensor assemblies are used to light selected LEDs, while out of flotation output signals from the sensor assemblies are used to light other LEDs and sound an alarm. This alerts an operator that the bench is out of flotation, permitting the operator to correct the problem.

11 Claims, 1 Drawing Sheet

BENCH FLOTATION SENSOR

BACKGROUND

The invention described herein was made in the course of or under a contract with the United States Government. The U.S. Government has certain license rights in this invention.

The present invention relates to flotation benches, and more particularly, to a bench flotation sensor for use with such benches that provides for noncontact and nonbias-inducing sensing of bench flotation.

Flotation benches are commonly used to test optical systems. The flotation benches are isolated as best is possible from any outside vibrational influences that would adversely affect tests. Bench isolators, which form part of the legs of the bench, have upper and lower stops, between which the bench is in proper flotation. Heretofore, the flotation status of the bench has to be determined by pushing down on the table and feeling the response of the bench, or crawling under the table and inspecting the mechanical stops of the bench.

However, exerting any measurable amount of force on the bench, such as by pushing on the bench with direct physical contact, or an air current impacting the bench, for example, is capable of bringing the bench out of flotation. This could go unnoticed, which would most likely disturb ongoing tests and require retesting. For example, during testing on the bench, if a bench isolator failed, in that the isolator was positioned against a stop, the failure would show up as bad data during subsequent data reduction. Therefore, the data collection process would have to be repeated.

There are no known prior art systems that provide for noncontact indication of bench flotation. For example, Newport Corporation, a major manufacturer of flotation benches, has tried numerous methods of instrumenting flotation benches. However, all of the proposed methods interfere with bench isolation.

Therefore, it is an objective of the present invention to provide for a bench flotation sensor that provides for the noncontact indication of bench flotation status.

SUMMARY OF THE INVENTION

In order to achieve the above objective, the present invention provides for a noncontact bench flotation sensor for use with a flotation bench. The sensor comprises a reflector target that is disposed on the body of the bench, typically on the inside of the skirt or overhanging portion of the top surface of the bench. The reflector target is such that it reflects over only a narrow region, or angle. Two sensor assemblies preferably infrared, are disposed on an isolator or leg of the bench. Each of the sensor assemblies are comprised of an infrared transmitter and an infrared detector, for example. Other suitable transmitters and detectors may also be employed with an appropriate reflector. The two sensor assemblies are separated by a distance that corresponds to upper and lower limits of bench flotation. These are typically set at or slightly above and below the lower and upper restraint stops on the bench isolators, respectively.

The infrared sensor assemblies transmit infrared energy at the reflector, and the reflector, due to the restricted reflection area, reflects energy back at the sensor only when the flotation bench is at or near the stops. In the event that the isolator moves to a point where one of the transmitters is aligned with the reflector, infrared energy is reflected back to the sensor assembly, and the infrared detector detects the reflected energy. An output signal is provided by the detector that is coupled to a display unit which incorporates a plurality of light emitting diodes (LEDs) and an annunciator. The output signal from the sensor is used to sound the alarm. This alerts an operator that the bench is out of flotation, permitting the operator to correct the problem. In addition, appropriate LEDs are lit to indicate the status of each isolator leg position.

Thus, the present sensor provides a apparatus for indicating bench flotation. The present invention allows indication of bench isolator malfunction or fault, thus allowing for immediate test termination, and permitting an operator to correct the fault. The present invention uses a sensor arrangement comprising detectors that make no physical contact with the bench. This prevents any disturbance of the bench that might occur if a mechanical device where used. The present invention thus provides for automated test equipment that is adapted to automatically test for bench flotation status and alert a user that the bench is out of flotation. The present invention permits flotation bench testing with the assurance that no undetected malfunction or fault in bench flotation or isolation will occur.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
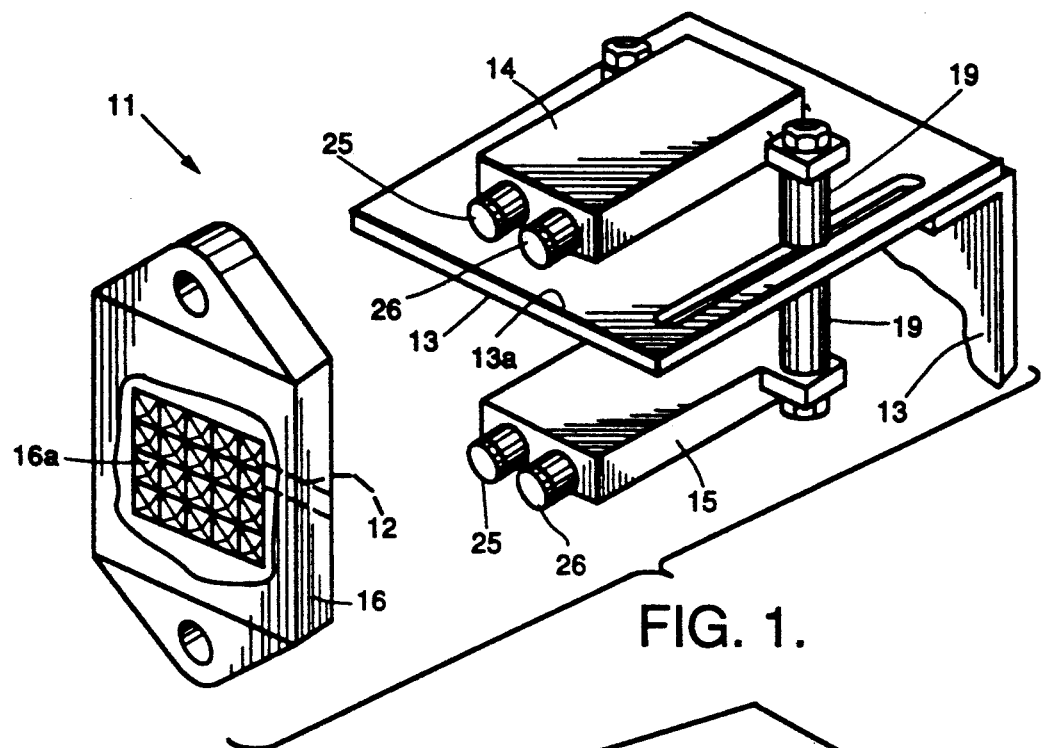
FIG. 1 illustrates a noncontact bench flotation sensor in accordance with the principles of the present invention.
Figure 2:
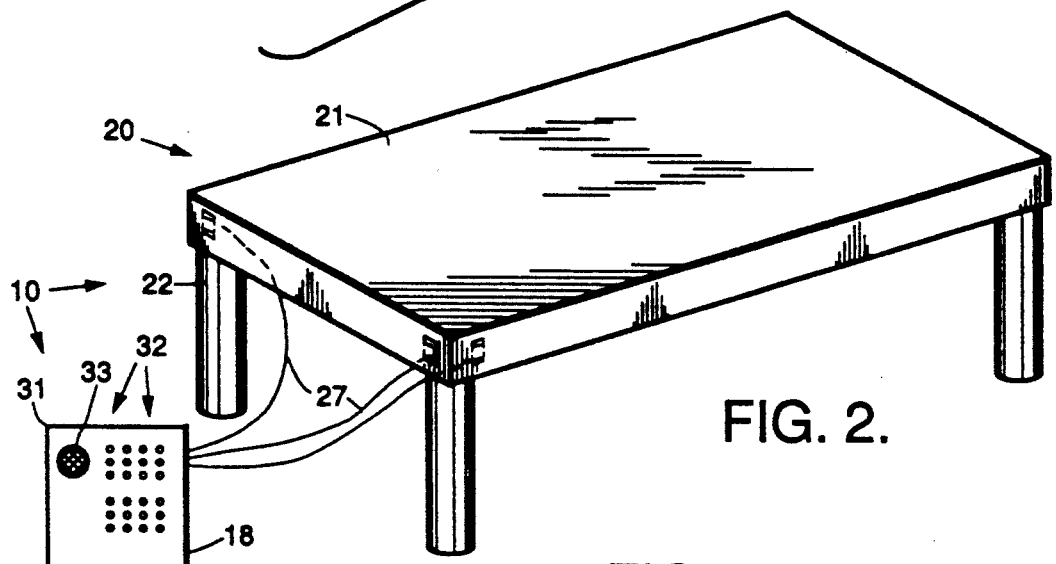
FIG. 2 shows the noncontact bench flotation sensor of FIG. 1 mounted on a flotation bench.

Referring to the drawing figures, FIG. 1 illustrates a noncontact bench flotation sensor 11 in accordance with the principles of the present invention. FIG. 2 shows a plurality of noncontact bench flotation sensors 11 shown in FIG. 1 mounted on a flotation bench 20, including a display unit 18 that is coupled to the noncontact bench flotation sensors 11. The noncontact bench flotation sensors 11 and the display unit 18 form a noncontact bench flotation system 10 in accordance with the present invention.

The flotation bench 20 comprises a skirted table 21 that is approximately five feet wide and twenty-two feet long. The table 21 is supported by a plurality of heavy pneumatic isolator legs 22, which typically number four or eight legs 22, for example. The legs 22 have pneumatically driven pistons which are powered by compressed air or other gas. The legs 22, when pressurized at a correct pressure, support the table 21 on a layer of air. Therefore, this effectively isolates the bench 20, and therefore any system under test disposed on the table 21, from earth and vibration sources.

Figure 3:
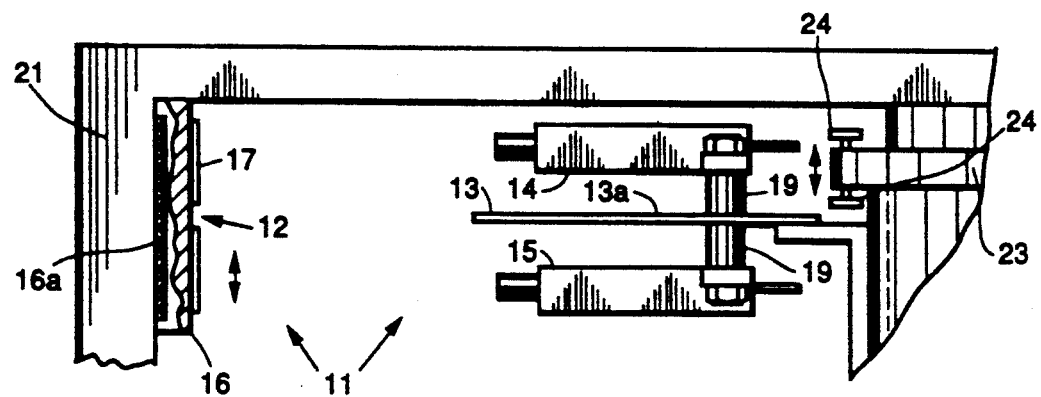
FIG. 3 illustrates an enlarged view illustrating one mounting arrangement of the noncontact bench flotation sensor of FIG. 1.

The position or height of the bench 20 is controlled by the amount of gas pressure each individual leg 22 supplies at its respective position. Typically, three of the corner legs 22 are controlled by master air valves, with the other five legs 22 serving as slaves. The air valves are lever actuated gates, with intake, output and exhaust ports. The exact height or position of the table 21, within limits, is determined by the pressure that is gated by the valves. The valve lever contacts the underside of the bench 20 by means of a vibration resistant flexible foot. The foot is threaded and adjustable, which gives a range of bench adjustments up and down. At a given adjustment, the valve automatically gates on, raising the bench 20 until the valve lever angle shuts off the air supply. All three master valves, with their respective slaves, work together or independently depending on bench loading. This action keeps the table 21 in a floated condition. The table 21 is adjustable up or down approximately 0.705 inches of total throw, or 0.352 inches in each direction from center. Referring to FIG. 3, the up and down movement is limited by a rigid steel restraint plate 23 attached to the underside of the table 21. The restraint plate 23 is mounted between three rigid metal restraint stops 24. The restraint stops 24 are mounted on top of the legs 22. The mechanical arrangement gives the entire bench 20 a maximum working range of approximately 0.705 inches. The ideal situation is for the bench 20 to be floating on all legs 22 somewhere in the 0.705 inch window.

Due to the size of the bench 20, bench loading, valve accuracy, valve repeatability, external air supplies, number of legs 22, and other such factors, flotation of the bench 20 is sometimes difficult. Often, one or more bench sections touch a restraint stop 24, which can invalidate hours or days of precise optical testing. Because of massive bench size this situation goes undetected.

Referring again to FIG. 1, in order to alleviate this problem, the present invention provides for a system 10 for detecting or sensing the flotation status of the bench 20. In a preferred embodiment, the present system 10 employs an infrared flotation sensor 11. However, it is to be understood that the present invention may operate at other than the infrared wavelength band by using appropriate reflectors and sensor assemblies, including energy sources, as will be described below. The present system 10 is comprised of four assemblies: an adjustable sensor mounting bracket 13, upper and lower infrared sensor assemblies 14, 15, a reflector target 16, and a display unit 18.

The noncontact bench flotation sensor 11 employs the reflector target 16, such as is provided by a retroreflector 16a, that is reflective in the infrared region of the energy spectrum, for example. The reflector target 16 shown in FIG. 1 has a mask 17 covering all areas that it normally would reflect, in order to provide for a relatively narrow reflecting area. Thus, there is a narrow reflecting slit or window 12 at the front face of the reflector target 16. The reflector target 16 may be a 2.2 inch by 1.0 inch by 0.37 inch molded acrylic rectangle, with mounting holes on both ends. The reflector target 16 has a corner cube design, permitting ease of alignment. A typical reflector target 16 is a model FE-RR6 retroreflector manufactured by Honeywell, for example. The reflector target 16 preferably comprises a parabolic reflector that is adapted to accommodate for nonplanar alignment of the bench and the sensor.

The sensor mounting bracket 13 has upper and lower infrared sensor assemblies 14, 15 secured to it. Other types of mounting arrangements may also be provided for the infrared sensor assemblies 14, 15. The sensor mounting bracket 13 holds and positions the infrared sensor assemblies 14, 15 adjacent each other, and separated by a predetermined distance. The sensor mounting bracket 13 is an adjustable L-bracket with a horizontal member 13a adapted to swivel over a range of 100 degrees left to right. The horizontal member 13a also is slotted, providing for front to back movement of the sensor assemblies 14, 15 of about one inch. Four spacers 19 serve to separate the infrared sensor assemblies 14, 15 the predetermined distance from each other. The sensor bracket 13 is designed to give three dimensions of adjustment for flexibility of the present system 10.

The infrared sensor assemblies 14, 15 are used as sensing devices. A typical sensor assembly is a model EE-SPZ401 sensor manufactured by Omron, for example. These particular infrared sensor assemblies have built-in photo-microsensors, including a transmitter 25 and a receiver or detector 26. The transmitter 25 is adapted to emit a modulated infrared beam, which the detector 26 can sense, it it is reflected back to it. The sensor assemblies 14, 15 operate in retroreflective mode. The retroreflective mode is one type of reflective scan, wherein a light beam is directed at the reflective target 16, which returns light along the same path it was sent. The sensor assemblies 14, 15 are three terminal devices, that operate in a "light-on" configuration in which incident light turns on an output transistor in the respective sensor assembly 14, 15 to generate an output signal.

The sensor including mounting bracket 13 and the infrared sensor assemblies 14, 15 are adapted to be mounted on the leg 22 of the flotation bench 20, as is shown in FIG. 2. Each of the infrared sensor assemblies 14, 15 comprise the infrared transmitter 25 and the infrared detector 26. The two infrared sensor assemblies 14, 15 are separated by a distance that correspond to upper and lower limits of flotation of the bench 20 determined by the restraint stops 24. The separation distance is typically set so that the sensor assemblies 14, 15 are located slightly above and below the lower and upper stops 24 on the bench legs 22, respectively. The infrared sensor assemblies 14, 15 are adapted to transmit infrared energy at the reflector target 16, and the reflector 16 is adapted to reflect the transmitted infrared energy and trigger a particular sensor assembly 14, 15 when the table 21 moves to a position adjacent one of the stops 24.

FIG. 3 illustrates an enlarged view illustrating one mounting arrangement of the noncontact bench flotation sensor 11 of FIG. 1 detailing the physical arrangement of the reflector target 16 and the infrared sensor assemblies 14, 15. The reflector target 16 is mounted on the inside of the skirt of the table 21, while the mounting bracket 13 is secured to the leg 22.

FIG. 2 also illustrates the display unit 18 for use with the sensors 11 of the present invention. The display unit 18 is comprised of a chassis or housing 31 that houses a plurality of sets of light emitting diodes (LED) 32 and a switchable audio annunciator 33. There are three LEDs 32 provided for each leg 22 of the flotation bench 20. The center LED 32 of each set is green, and when activated, identifies the particular bench location associated with that particular leg 22, and that the table 21 is in a floating condition at that leg 22. The other two LEDs 32 are red and are arranged above and below the green LED, and indicate a nonfloating condition of the table 21 at the location of a leg 22. If the top red LED is activated, for example, this tells an operator that the table 21 is not floating and that the table 21 is at the top of the predetermined limit. If the bottom red LED is activated, this tells the operator that the table 21 is not floating and that the table 21 is at the bottom of the predetermined limit. Only one of the three LEDs 32 in any set is on at any one time. Ideally, the green LED is activated for each leg 22. The audio annunciator 33 also turns on for any nonfloating condition.

Calibration of the present system 10 for optical sensing is straightforward. The three factors affecting sensing are (1) horizontal distance between sensor assemblies 14, 15 and the target reflector 16, (2) vertical spacing between sensor assemblies 14, 15, and (3) the size of the window 12 of the reflecting target 16. Using the three-axis adjustable sensor bracket 13, calibration may be achieved visually while the system 10 is in operation, or precalibration may be done mathematically on the bench 20.

System operation is as follows. The sensor assemblies 14, 15 are mounted to the bench legs 22, with reflector targets 16 mounted on the inside surfaces of the skirts of the table 21 a short distance away. The sensor assemblies 14, 15 are connected to the display unit 18 using conventional electrical cables 17. As the table 21 and the reflector targets 16 move relative to the sensor assemblies 14, 15, output signals from each of sensor assemblies 14, 15 are sent to the display unit 18. The flotation condition of the bench 20 is then indicated by means of the LEDs 32 and an out of flotation condition is indicated by a change from the illumination of a green LED 32 to the illumination of a red LED 32 and the sound provided by the annunciator 33.

More particularly, in the event that the table 21 moves to a point where one of the transmitters 25 is aligned with the reflector target 16, infrared energy is reflected back to the detector 26, and the infrared sensor 11 detects the reflected energy and couples an output signal to the display unit which lights an appropriate LED 32 and sounds an alarm using the annunicator 33. This alerts the operator that the bench 20 is not floating, permitting the operator to correct the problem.

With particular reference to an embodiment of the present system 10 that was built and tested, the sensor 11 comprises two infrared sensor assemblies 14, 15 on each leg 22 of the bench 20. The two sensor assemblies 14, 15 are positioned parallel to each another and spaced approximately 1.0 inch apart (the spacing can be adjusted to compensate for different spacings of bench mechanical stops). Adjacent to each infrared sensor assembly 14, 15 is the reflector target 16. The two sensor assemblies 14, 15 are used to determine high and low fault conditions of the bench 20. The output of each sensor assemblies 14, 15 is connected to a circuit board in the unit 18 that determines the high fault, low fault, and no fault conditions. If a no fault condition, the green LED 32 is lit. For a high or low fault condition, the corresponding high or low red LED 32 is lit and the annunciator 33 sounds. A set of LEDs 32 is used for each of the sensor assemblies 14, 15 attached to each leg 22. This allows quick pin-pointing of a faulty leg 22.

The present invention has been built and has been tested on a Newport Corporation flotation bench. Out-of-flotation and isolator failures have been detected without disturbing bench testing operations.

Thus there has been described a new and improved bench flotation sensor for use with such benches that provides for noncontact and non-bias-inducing sensing of bench flotation. It is to be understood that the above-described embodiment is merely illustrative of one of the many specific embodiments that represent applications of the principles of the present invention. Clearly, numerous and other arrangements can be readily devised by those skilled in the art without departing from the scope of the invention.

What is claimed is:

1. A bench flotation sensor system that is adapted for use with a flotation bench, said system comprising:

a reflector that is adapted to be mounted at a first predetermined location on the flotation bench;

first and second sensor assemblies that each comprise a transmitter and a detector responsive to energy transmitted by the transmitter, wherein the first and second sensor assemblies are separated by a predetermined distance that corresponds to upper and lower flotation limits of the flotation bench, and wherein the first and second sensor assemblies are adapted to be mounted at a second predetermined location on the bench, and wherein the reflector is adapted to move relative to the first and second sensor assemblies, and wherein the first and second sensor assemblies are adapted to provide output signals indicative of their relative location with respect to the reflector, and display means coupled to the first and second sensor assemblies for providing an indication of the flotation status of the flotation bench which corresponds to the output signals provided by the first and second detector assemblies.

2. The system of claim 1 wherein the first and second sensor assemblies each comprise an infrared transmitter and an infrared detector.

3. The system of claim 1 wherein the reflector comprises a retroreflector.

4. The system of claim 1 wherein the reflector comprises a parabolic reflector.

5. The system of claim 1 wherein the display means comprises:

a housing coupled to the first and second sensor assemblies by means of a cable;

a plurality of light emitting diodes disposed in the housing and coupled to the first and second sensor assemblies by means of the cable and wherein a first light emitting diode is indicative of proper flotation, and wherein second and third light emitting diodes are indicative of high and low nonfloating conditions; and an audio annunciator disposed in the housing and coupled to the first and second sensor assemblies by means of the cable that is adapted to sound upon the occurrence of a high or low nonfloating condition.

6. Apparatus comprising:

a flotation bench comprising a plurality of legs and a floatable table coupled to the plurality of lege, and wherein the table is adapted to float between upper and lower stops;

a plurality of bench flotation sensors respectively coupled to the plurality of legs and the table of the bench, wherein each sensor comprises:

a reflector mounted at a first predetermined location on the bench;

first and second sensor assemblies that each comprise an infrared transmitter and an infrared detector, wherein the first and second sensor assemblies are separated by a predetermined distance that corresponds to the distance between the upper and lower stops, and wherein the first and second sensor assemblies are adapted to be mounted at a second predetermined location on the bench, and wherein the reflector and the first and second sensor assemblies are adapted to move relative to each other, and wherein the sensor assemblies are adapted to provide output signals indicative of the relative positions of the reflector and the first and second sensor assemblies, which relative positions are indicative of the flotation status of the table; and display means coupled to each of the first and second sensor assemblies for providing an indication of the floatation status of the table which corresponds to the output signals provided by the respective first and second detector assemblies.

7. The system of claim 6 wherein the reflector comprises a retroreflector.

8. The system of claim 6 wherein the display means comprises:

a housing coupled to the first and second sensor assemblies by means of a cable;

a plurality of light emitting diodes disposed in the housing and coupled to the first and second sensor assemblies by means of the cable and wherein a first light emitting diode is indicative of proper flotation, and wherein second and third light emitting diodes are indicative of high and low nonfloating conditions; and an audio annunciator disposed in the housing and coupled to the first and second sensor assemblies by means of the cable that is adapted to sound upon the occurrence of a high or low nonfloating condition.

9. Apparatus comprising:

a flotation bench comprising a plurality of isolators and a flotable table coupled to the plurality of isolators and wherein the table is adapted to float between upper and lower stops located on the isolators; and a plurality of bench flotation sensors coupled to each of the plurality of isolators and the table, wherein each sensor comprises:

a reflector mounted at a predetermined location on the table adjacent a respective isolator;

first and second sensor assemblies located adjacent the reflector that each comprise an infrared transmitter and an infrared detector, wherein the first and second sensor assemblies are separated by a predetermined distance that corresponds to the distance between the upper and lower stops, and wherein the first and second sensor assemblies are mounted on the isolators adjacent the reflector, and wherein the first and second sensor assemblies move relative to the reflector, and wherein the sensor assemblies are adapted to provide output signals indicative of the relative positions of the reflector and the first and second sensor assemblies, which relative positions are indicative of the flotation status of the table; and display means coupled to the first and second sensor assemblies for providing an indication of the floatation status of the table which corresponds to the output signals provided by the respective first and second detector assemblies.

10. The system of claim 9 wherein the reflector comprises a retroreflector.

11. The system of claim 9 wherein the display means comprises:

a housing coupled to the first and second sensor assemblies by means of a cable;

a plurality of light emitting diodes disposed in the housing and coupled to the first and second sensor assemblies by means of the cable and wherein a first light emitting diode is indicative of proper flotation, and wherein second and third light emitting diodes are indicative of high and low nonfloating conditions; and an audio annunciator disposed in the housing and coupled to the first and second sensor assemblies by means of the cable that is adapted to sound upon the occurrence of a high or low nonfloating condition.

* * * * *